July 25, 1961 K. LEHOVEC 2,993,998

TRANSISTOR COMBINATIONS

Filed June 9, 1955

INVENTOR.

KURT LEHOVEC

BY

Connolly and Hutz

HIS ATTORNEYS

United States Patent Office 2,993,998
Patented July 25, 1961

2,993,998

TRANSISTOR COMBINATIONS

Kurt Lehovec, Williamstown, Mass., assignor to Sprague Electric Company, North Adams, Mass., a corporation of Massachusetts Filed June 9, 1955, Ser. No. 514,220
5 Claims. (Cl. 250—211)

This invention relates to transistor combinations, more particularly to combinations by which signals can be amplified.

Among the objects of the present invention is the provision of novel transistor combinations which have improved amplification characteristics as compared to prior art combinations.

The above as well as additional objects of the present invention will be more clearly understood from the following description of several of its exemplifications, reference being made to the accompanying drawings wherein.

A unipolar transistor was fully described by W. Shockley in an article, entitled "A Unipolar Field Effect Transistor," which appeared in the November 1952 issue of the Proceedings of the IRE, Volume 40, No. 11, pages 1365–1376. Briefly the device consists essentially of a semiconductor having a conducting channel with an adjacent equipotential layer or gate electrode and a space charged region in the semiconductor between the channel and the equipotential layer. By varying the potential between the channel and the equipotential layer, the effective channel width can be varied and the channel current which is being carried therein is similarly varied. When the current flows along the channel the potential thus varies along the channel, which in turn results in a potential variation between the channel and the equipotential layer. As a result, the width of the space charged region varies along the channel and with sufficiently high potentials imposed on opposite ends of the channel, the space charged region may extend completely over the channel rendering it insulating or may even cause breakdown if maintained. This limits the usefulness of the device. It is thus the intent of this invention to render these unipolar field effect transistors less susceptible to breakdown or alternatively, susceptible to much higher current gain, as well as reliability of operation when used with signal voltages of substantial amplitudes.

It has been found possible to improve the operating curve of the unipolar transistor so as to handle larger signal voltages as well as to produce much higher power gains, through provision of two parallel current flows in a unipolar transistor so as to maintain the width of the charged layer at a uniform dimension. This is readily accomplished as indicated by providing a potential drop along the gate electrode which is the same or similar to the voltage drop along the channel.

Figure 1:
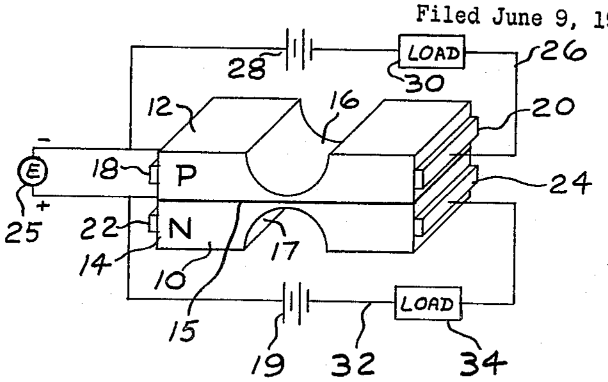
FIG. 1 is a representative showing, partly in schematic form, of one embodiment of a unipolar transistor.

For better understanding of this invention refer to FIG. 1, wherein the combination here illustrated has a semiconductor body 10 with two portions 12, 14 of opposite types of conductivity. Portion 12, for example, is indicated as having p-conductivity and portion 14 n-conductivity. Between them there is a p–n junction 15 that is relatively elongated. Intermediate of the ends of the rectangular crystal 10 are two depressions 16 and 17, the former extending down into the p-region of conductivity and the latter extending into the n-region of conductivity. These grooved areas extend fully across the face of the crystal and are readily produced by magnetostrictive cutting followed by a jet electrochemical etch, both techniques of which are well-known to the art. The thickness of the web formed in the crystal between the points of maximum depth of depressions 16 and 17 is preferably very thin, not over 20 mils thick, and preferably much thinner, in the order of 2 mils thickness. Of course, it is to be realized that this lower limit of distance between the two depressions is dictated by the structural strength requirements which the device must exhibit. However, for optimum operational characteristics the thin region separation is desirable although the crystal can readily be supported by outside insulators, such as plastic holders, etc.

At opposite ends of each portion 12, 14 are positioned electrodes represented at 18, 20, 22, 24. A bias supply 25 is connected between a correspondingly located pair of electrodes 18, 22, on the respective semiconductor portions, to bias the portions in the direction that blocks the passage of current from one body to the other. In the construction of FIG. 1 the bias supply also impresses varying signals "E" between the same electrodes 18, 22.

Electrodes 18, 20 are shown as connected to an output circuit 26 including a source of potential 28 and an output load 30. Another output circuit 32 is similarly connected between electrodes 22 and 24 and similarly polarized. For purposes of discussion the n-conductivity having electrodes 22 and 24 is designated the "channel" while the p-region with its electrodes 18 and 20 is designated the "gate."

The entire combination of FIG. 1 makes a so-called unipolar transistor amplifier in which the junction 15 provides a space charge effect that is substantially uniform along its length. For the greatest uniformity the semiconductor portions 12, 14 should have corresponding electrical resistivities, e.g. of the order of 5 ohm-centimeters, and the output circuits should be arranged to apply corresponding potentials so that there are corresponding potential gradations along the effective length of the junction in both the channel and gate portions. The resistivities are controlled by the concentration of doping ingredients added to the respective semiconductor bodies either by diffusion into the solid body, surface melting or by alloying with a liquefied mass from which the bodies are formed.

A feature of the construction of FIG. 1 is that two different amplified output signals are provided so that one can be used independently of the other as a monitor, for example. In addition, where maximum power output is desired, both output signals can be combined as by transformer coupling. This is made possible by the use of the two depressions 16 and 17 so that the dimension of the space charge region could materially effect the current flow in the channel. Herein, in FIG. 1, for one part of the circuit including load 30 the n-region is the channel and the p-region the gate, and for the other part of the circuit including load 34, vice versa.

Figure 2:
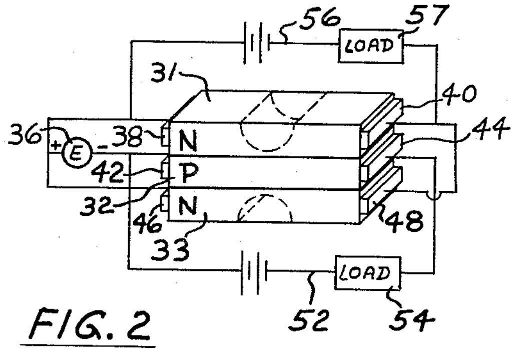
FIG. 2 is a schematic showing of a modified unipolar transistor combination according to the present invention.

FIG. 2 shows a modified construction of the unipolar transistor type in which one region of conductivity is sandwiched between regions of opposite conductivity. The three regions are illustrated as 31, 32, 33, being produced by techniques well-known in the art. Blocking bias, as well as incoming signals, are supplied by source 36 between the intermediate body 32 on the one hand, and the outer two which can be connected together. Electrodes 38, 40, 42, 44, 46 and 48 are provided on the individual bodies as in the construction of FIG. 1.

The junction construction of FIG. 2 also has two output circuits 52, 56. One of these is connected to intermediate body 32 as in the construction of FIG. 1. The second output circuit 56 is connected to both outer bodies 31, 33 in parallel. As a result of this construction, signals in the sandwiched body are subjected to what corresponds to two space charge effects, one at each junction. The voltage amplification of this body will therefore be larger than that of the others. Moreover, signal currents in the outer bodies can be added together by the parallel output connection.

With the construction of FIG. 2 the amplified output is taken from load 54 while load 57 serves merely to maintain the space charge region relatively constant along the junction. For taking a useful output from both loads 54 and 57 depressions similar to those of FIG. 1 must be imposed in the n-regions 31 and 33 completely across the opposing faces of the crystal.

Figure 3:
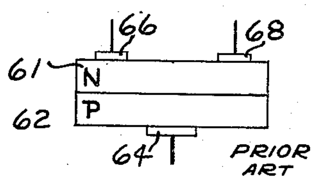
FIGS. 3 and 4 are diagrammatic views of prior art forms of unipolar transistors.
Figure 4:
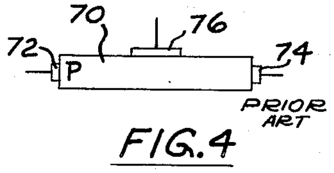

FIGS. 3 and 4 are cross-sectional representations of known prior art devices of the unipolar field effect type. In FIG. 3 the n-region designated as 61 has two electrodes 66, 68 between which an output circuit can be connected. Bias, as well as incoming signals, are supplied between electrode 64 and one of the electrodes 66, 68 using the p-region to produce the gate and the n-region as the channel. In this construction, as well as the construction shown in FIGS. 1 and 2, all of the electrodes are of a non-rectifying nature.

In FIG. 4, however, an area metal contact which extends fully across the width of the crystal is utilized to produce a space charged region which can thus serve as the modulating means for the current flow in the channel. A semiconductor body 70 designated for the purposes of this discussion as having a conductivity of the p-type has spaced output electrodes 72 and 74 of the non-rectifying kind and an intermediate electrode 76 of the rectifying metal type. Thus a space charge effect similar to that described above appears to be provided by the metal electrode 76 when it is electrically biased in the current blocking direction. The bias and the incoming signals are impressed between the metal electrodes 76 and one of the other electrodes. Amplified output signals can be taken thus from between electrodes 72 and 74. The construction of FIG. 3 is susceptible to breakdown at pinch-off because here, as well as in the Shockley discussion, the space charged region is non-uniform with the junction area. Breakdown additionally may occur rendering the device conducting so that the FIG. 4 construction is limited both in current level, as well as amplification characteristics.

Figure 5:
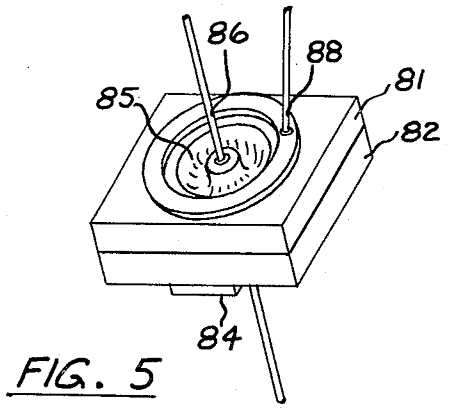
FIGS. 5 and 6 are pictorial representations of modified unipolar semiconductor devices according to the invention.

In FIG. 5 is shown an embodiment of the invention constituting an improvement of the unipolar transistor construction shown in FIG. 3. This construction somewhat similar to that of FIG. 3 has a first semiconductive region 81 and a second semiconductive region 82, the regions having opposite types of conductivity so that a junction exists between them. Output electrodes are illustrated in the form of a central non-rectifying electrode 86 engaging body 81, and a circular non-rectifying electrode 88 surrounding electrode 86. Between the two electrodes 86, 88 is produced an annular depression 85 extending into body 81 in order to increase the amplification effect of the device. The depth of the depression should be such as to approach the junction region, e.g. less than 5 mils therefrom. The use of a rotating etch jet as described in the above-identified patent application, Serial No. 460,835 (abandoned), makes a very convenient technique for the annular cutting operation. A suitable biasing electrode of the non-rectifying type can be provided as indicated, for example, at 84. Using this technique allows close control of the distance between the junction and bottom of cut.

Of course, it is to be understood that where even higher amplification is desired or where it is desired to increase the useful current ranges of the device, thus requiring complete avoidance of the breakdown in the pinch-off region resulting from the non-uniformity of the space charged region, the construction of FIG. 5 is modified to conform to the concept of FIG. 1. This is readily accomplished by imposing a second annular groove on the opposite surface of the crystal of FIG. 5, namely that surface whereon electrode 84 is shown to be imposed.

Instead of applying the bias to the same electrodes by which the input signals are impressed, other electrodes can be used. In the construction of FIG. 1, for example, bias can be provided between electrodes 18 and 22, whereas the input signals can be applied between electrodes 20 and 24. A similar arrangement can be used in the construction of FIG. 2. Furthermore, the bias need not be applied between correspondingly located electrodes, and can be impressed between electrodes 18 and 24, for example. The incoming signals can also be applied in this manner.

Figure 6:
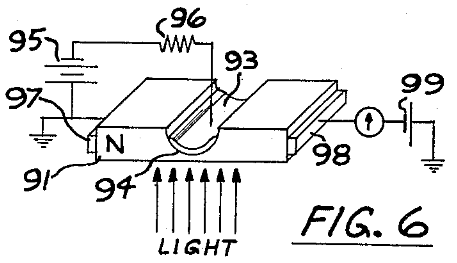

FIG. 6 shows a further form of unipolar transistor construction most useful as a photosensitive device in which the bulk of the crystal 91 is of one conductivity, e.g. n-type, however a diffused junction exists at the region of the depression. In the depression there is an electrode 93, and at opposite edges of the crystal are non-rectifying electrodes 97, 98. The electrode 93 and one of the other non-rectifying electrodes 97 are connected to a high impedance bias source shown as a resistive impedance 96 and a voltage source or battery 95. When the body 91 of such material is exposed to incident light, current flows across the web between electrode 93 adjacent the irradiation site and the crystal 91. This current flow reduces the bias imposed by the battery 95 through resistor 96. Thus the space charge in body 91 adjacent to electrode 93 is reduced allowing greater flow of current in the channel between non-rectifying electrodes 97, 98.

The voltage source 95 biases the electrode 97 in the current-blocking direction. With the impedance 96 relatively low as compared to the blocking impedance of the un-illuminated junction, the potential of source 95 is essentially entirely impressed across this junction 94. When irradiation takes place, the impedance of the junction is sharply diminished so that the potential across the junction 94 is greatly lowered. The lowering of the potential across the blocking junction causes a corresponding amplified change in the current passed between output electrodes 97, 98 as a result of the decrease of the space charge region. The photoelectric output of the construction of FIG. 6 will accordingly be much higher than that conventionally obtained from present devices, and has a sensitivity to radiation which is remarkable.

Although it is to be fully understood that the following specific examples are representative of the best constructions known to us, they should not in any way limit the scope of the instant invention. Reference should now be made to the drawing of FIG. 1 wherein in its preparation one would take a rectangular slab of p-n junction crystal produced by surface melting techniques or other techniques known to the art, and properly dimension the crystal as follows: The crystal could be a cube of 100 mils in each dimension with the junction region substantially in the center of the plane of the cube. Such a crystal would be of germanium and have for the p-impurity indium and for the n-impurity antimony, with each region of conductivity having a resistivity in the order of 5 ohm-centimeters. As indicated above, such a crystal could be produced by any of the known techniques including the surface melting technique fully disclosed in the copending application of Lehovec et al., Serial No. 364,138, filed June 25, 1953 (abandoned). The depressions 16, 17 should be then imposed across the opposing faces of the crystal first by magnetostrictive cutting with an appropriate tool, which technique is fully disclosed in United States Patent No. 2,580,716. The width of this cut would be approximately 15 mils and extend with vertical sides down to the region adjacent to the junction. After the magnetostrictive cutting has produced a depression of approximately 40 mils depth or within 10 mils of the junction area, the final cutting should be accomplished by jet-etching techniques in the manner described in the Tiley et al. article in the December 1953 issue of the Proceedings of the I.R.E., pages 1706–1708, or as described in the co-pending Lehovec et al. application, Serial No. 460,835, filed October 7, 1954 (abandoned). Etching would then continue with the jet-electrochemical etching technique until the depth of the cut is within about 1 mil of the junction or alternatively, until the opposing cuts have a crystal web thickness approximating two mils separating them. Non-rectifying electrodes 18, 20, 22 and 24 would then be imposed upon the crystal after it has been thoroughly etched so as to exhibit rectifying characteristics. This etch would be of the conventional hydrofluoric acid type etch. Copper leads can be imposed as the non-rectifying electrodes by means of using a lead-tin solder containing indium for the p-region, that is electrodes 18 and 20 and antimony for the n-region of conductivity, that is electrodes 22 and 24. The bias voltage E25 should, for suitable operation, be 100 v., while potential sources 28, 19 should be 30 v. For the load resistors 30, 34 a suitable value would be about 5000 ohms.

Now referring to FIG. 6, the crystal 91 could be made of n-type germanium, e.g. germanium doped with antimony to a resistivity of approximately 5 ohm-centimeters. A typical dimension for the crystal would be 100 mils by 100 mils rectangular surface area and a thickness of from 10 to 20 mils. A depression would be created fully across the face of the crystal using magnetostrictive cutting techniques followed by electrochemical etching until the depth of the cut approaches within 2 mils of the opposite surface of the electrode. Thereafter the crystal would be thoroughly etched, washed and dried prior to imposition of the area of opposite or rectifying conductivity 94 at the depression or web of the crystal. This fabrication of area 94 would be accomplished by placing a wire of indium on the bottom of the groove and thereafter heating the crystal in a hydrogen atmosphere at 500° C. for 5 minutes. This should result in the penetration of the indium into the germanium web of substantially 1 mil so that a junction is therein produced. The non-rectifying electrodes 97, 98 are readily attached by using lead-tin solder having a minor amount of antimony so as to produce a non-rectifying junction. To attach the electrode 93 a nickel wire is placed adjacent to the indium deposit and fused therein to that region by heating the wire by radiation from a wire loop. The potential of the bias 95 should be in the order of 100 v. so as to effectively cut off current flow and the resistive impedance 96 of about 100,000 ohms. The potential of the battery 99 to induce current flow between electrodes 97, 98 to the n-region 91 should be in the order of 30 v.

A thin semiconductor body or zone can also be made from a semiconductor mass having a p-n junction by causing the junction to shift toward a boundary surface. By having one of the semiconductor portions on one side of the junction doped to a greater degree than the other, a high temperature diffusion treatment will cause the more highly doped section to become larger so that the junction will be effectively shifted. Annealing for from 15 minutes to an hour or more at temperatures of 40 to 50° C. below the melting point of the semiconductor mass will be suitable for the above type of operation. In general a temperature below and within 100° C. of the melting point can be used. The same type of shifting can be provided with the sandwich construction of FIG. 2, for example. In this case both end bodies 31 and 33 will be more heavily doped than the intermediate body 32 so that the diffusing operation will have the desired result. One can also alter the junction width by suitable selection of donor and acceptor materials. To narrow the p-region of a multiple symmetrical n-p-n crystal an n-impurity of higher diffusion constant than that of the p-type impurity would be used; to widen the p-region, an n-impurity of lower diffusion constant would be used, the crystal being subjected to the annealing conditions above.

Another desirable feature of the annealing treatment is that it increases the breakdown voltage of the junction. Among other benefits is the fact that the higher bias potentials can be used, larger input signals can be handled, etc. By way of example, a one-hour treatment at 900° C. increases the breakdown voltage from 120 to 170 volts.

As many apparently widely different embodiments of this invention may be made without departing from the spirit and scope hereof, it is understood the invention is not limited to the specific embodiments hereof except as defined in the appended claims.

What is claimed is:

1. A transistor combination having a p-conductive semiconductor portion, an n-conductive semiconductor portion, an elongated p-n junction between the portions, a pair of non-rectifying electrodes at corresponding spaced locations on each portion, bias means connected for biasing the junction in the current blocking direction, an input connection for impressing incoming signals between two of the electrodes at corresponding locations on the respective portions, and a pair of output circuits each connected to pass current corresponding to amplifications of said incoming signals through the respective portions from one electrode to the other and cause corresponding electrical variations along the length of the junction.

2. The combination of claim 1 in which there is a third semiconductor portion providing another elongated p-n junction generally parallel with and spaced equally from the first junction, and a third pair of electrodes is located on the third portion at locations corresponding to the other pairs.

3. The combination of claim 1 in which at least one of the semiconductor portions has at least part of its inter-electrode section shallower than the remainder, and the shallow region is not more than about 1 mil thick.

4. A unipolar transistor combination comprising a semiconducting body of one conductivity type, two spaced ohmic contacts on said body, a narrow web section in said body between said two ohmic contacts, a region of opposite conductivity type at one surface of the said narrow web section whereby a P-N junction is formed adjacent said one surface, means to bias said P-N junction in the blocking direction such that the space charge layer at said P-N junction extends over a substantial part of the narrow web section having said one conductivity type, whereby the resistance between said ohmic contacts is governed by the potential applied at said P-N junction.

5. A photoamplifier comprising a semiconducting body of one conductivity type, a portion of said body exposed for receiving light rays, a narrow web formed in said body at said portion, two spaced ohmic electrodes on said body in a geometrical arrangement such that current passed therebetween is forced to flow through said narrow web, means to induce a space charge layer in said narrow web including a rectifying contact at the face of said narrow web opposite said portion, means to apply a bias voltage in the blocking direction to said rectifying contact of such magnitude that said space charge layer extends substantially across the entire narrow web thereby blocking the current path between said two ohmic electrodes in absence of illumination, a resistance in series with said rectifying contact of such a magnitude that the voltage drop across said series resistance due to the photocurrent flowing through said rectifying contact when the narrow web is illuminated reduces the bias voltage at said rectifying contact thus decreasing the width of said space charge layer thereby releasing a part of said narrow web for current flow between said two ohmic electrodes, the resistance between said two ohmic electrodes thus decreasing with increasing light intensity incident on said narrow web.

(References on following page)

References Cited in the file of this patent

UNITED STATES PATENTS

| | | |
|---|---|---|
| 2,502,488 | Shockley | Apr. 4, 1950 |
| 2,563,503 | Wallace | Aug. 7, 1951 |
| 2,570,978 | Pfann | Oct. 9, 1951 |
| 2,691,736 | Haynes | Oct. 12, 1954 |
| 2,701,326 | Pfann et al. | Feb. 1, 1955 |
| 2,744,970 | Shockley | May 8, 1956 |
| 2,764,642 | Shockley | Sept. 25, 1956 |
| 2,769,926 | Lesk | Nov. 6, 1956 |
| 2,805,347 | Haynes et al. | Sept. 3, 1957 |
| 2,812,446 | Pearson | Nov. 5, 1957 |
| 2,815,303 | Smith | Dec. 3, 1957 |
| 2,828,232 | Myer | Mar. 25, 1958 |
| 2,863,056 | Pankove | Dec. 2, 1958 |